United States Patent
Hara et al.

(10) Patent No.: US 7,495,937 B2
(45) Date of Patent: Feb. 24, 2009

(54) PWM CYCLOCONVERTER

(75) Inventors: Hidenori Hara, Fukuoka (JP); Junkoo Kang, Fukuoka (JP); Eiji Yamamoto, Fukuoka (JP); Kenji Yamada, Fukuoka (JP)

(73) Assignee: Kabushiki Kaisha Yaskawa Denki, Tokyo (JP)

( * ) Notice: Subject to any disclaimer, the term of this patent is extended or adjusted under 35 U.S.C. 154(b) by 151 days.

(21) Appl. No.: 10/572,673

(22) PCT Filed: Sep. 13, 2004

(86) PCT No.: PCT/JP2004/013301

§ 371 (c)(1),
(2), (4) Date: Mar. 20, 2006

(87) PCT Pub. No.: WO2005/029690

PCT Pub. Date: Mar. 31, 2005

(65) Prior Publication Data

US 2007/0081369 A1     Apr. 12, 2007

(30) Foreign Application Priority Data

Sep. 19, 2003   (JP) .............................. 2003-327242

(51) Int. Cl.
*H02M 5/45*   (2006.01)
(52) U.S. Cl. ........................... 363/37; 307/424; 363/159
(58) Field of Classification Search .................. 363/13, 363/15, 16, 17, 34, 37, 67, 71, 72, 149, 156, 363/157, 159, 98, 132, 125; 307/38, 39, 307/424, 46, 66, 67
See application file for complete search history.

(56) References Cited

U.S. PATENT DOCUMENTS

| | | | | | |
|---|---|---|---|---|---|
| 4,420,718 | A | * | 12/1983 | Sakai et al. | 318/729 |
| 5,047,909 | A | * | 9/1991 | Hosoda | 363/40 |
| 5,191,520 | A | * | 3/1993 | Eckersley | 363/72 |
| 5,198,970 | A | * | 3/1993 | Kawabata et al. | 363/37 |
| 5,504,667 | A | * | 4/1996 | Tanaka et al. | 363/37 |
| 5,621,627 | A | * | 4/1997 | Krawchuk et al. | 363/37 |
| 5,642,270 | A | * | 6/1997 | Green et al. | 363/17 |
| 5,677,606 | A | * | 10/1997 | Otake | 318/434 |
| 5,949,664 | A | * | 9/1999 | Bernet et al. | 363/37 |
| 5,982,645 | A | * | 11/1999 | Levran et al. | 363/37 |
| 6,278,622 | B1 | * | 8/2001 | Shimazaki et al. | 363/37 |
| 6,351,397 | B1 | * | 2/2002 | Sawa et al. | 363/50 |
| 6,556,464 | B2 | * | 4/2003 | Sakai et al. | 363/132 |
| 6,566,764 | B2 | * | 5/2003 | Rebsdorf et al. | 290/44 |
| 6,741,063 | B2 | * | 5/2004 | Sakai et al. | 318/809 |

(Continued)

FOREIGN PATENT DOCUMENTS

JP           61-69333 A        4/1986

(Continued)

*Primary Examiner*—Akm E Ullah
*Assistant Examiner*—M'Baye Diao
(74) *Attorney, Agent, or Firm*—Sughrue Mion, PLLC

(57) ABSTRACT

A PWM cycloconverter easily capable of improving an input current waveform and regenerating energy of a snubber into a power source is provided.

A PWM cycloconverter includes a PWM converter connected to a DC voltage system. An output unit of the PWM converter is connected to a place before an input filter of the PWM cycloconverter to keep down resonance of the input filter.

3 Claims, 5 Drawing Sheets

U.S. PATENT DOCUMENTS

| | | | | |
|---|---|---|---|---|
| 6,771,524 B2 * | 8/2004 | Miguchi | | 363/149 |
| 6,856,040 B2 * | 2/2005 | Feddersen et al. | | 290/44 |
| 7,327,113 B2 * | 2/2008 | Steigerwald et al. | | 318/599 |
| 2003/0052544 A1 * | 3/2003 | Yamamoto et al. | | 307/66 |

FOREIGN PATENT DOCUMENTS

| JP | 63-114531 A | 5/1988 |
|---|---|---|
| JP | 4-33527 A | 2/1992 |
| JP | 8-265085 A | 10/1996 |
| JP | 2003-244960 A | 8/2003 |

* cited by examiner

PWM CYCLOCONVERTER

TECHNICAL FIELD

The invention relates to a PWM cycloconverter in which using a PWM converter connected to an input unit of the PWM cycloconverter allows an arbitrary electric current waveform to be achieved so that input current distortion can be kept down.

BACKGROUND ART

FIG. 6 shows a system of a conventional PWM cycloconverter. In FIG. 6, 1 denotes a three-phase AC power source, 2 denotes a three-phase AC reactor, 3 denotes a three-phase AC capacitor, 4 denotes a bi-directional switch group, 5 denotes a motor functioning as a load, 6 denotes a three-phase AC reactor, 7 denotes a PWM converter for converting AC into DC, 14 denotes a smoothing capacitor, which is a DC voltage means, $9_{1-3}$ denote a detection current signal of the three-phase AC power source, 10 denotes a CT for detecting electric current, which is a current detection means for detecting electric current of the three-phase AC power source, 11 is a CT for detecting electric current, which is a current detection means, $12_{1-3}$ is a detection current signal of the CT for detecting electric current and $15_{1-9}$ denote snubber circuits provided on respective bi-directional switches of the bi-directional switch group 4.

In FIG. 6 showing a conventional embodiment, a small-sized PWM converter is used for keep down resonance voltage of an input filter, similarly to the invention. In FIG. 6, however, an output of the PWM converter is connected after (on a secondary side of) the filter for the purpose of keeping down voltage. Accordingly, applying electric current more than the quantity equal to correction of a resonance component adversely causes large variation in condenser voltage, and therefore, quantity of correction is limited. The conventional PWM converter has such a demerit. Therefore, an effect is limited especially in a system where energy of a snubber is regenerated as shown in FIG. 3. A PWM cycloconverter is an AC-AC directly power-converting apparatus for directly converting a three-phase AC power source voltage into a variable voltage having variable frequency (arbitrary voltage and frequency). On the basis of the principle of the PWM cycloconverter, pulse current flows in an input unit of the semiconductor device for electric power. In order to prevent the pulse current from returning to a power source system, an AC reactor and an AC capacitor are generally used to provide a low-pass filter. When electric current flows in the filter, however, a resonance phenomenon occurs between the reactor and the capacitor, so that resonance current flows into the input unit. The resonance current deteriorates a rate of distortion of the input current. Further, the electric current flows in the condenser even in the case that the PWM cycloconverter does not operate, so that the resonance current is also generated.

As a conventional method of keeping down the resonance current, proposed is a method of using a small-sized PWM cycloconverter connected to a DC voltage source of a snubber part to perform input current correction.

Patent Reference 1: JP-A-2003-244960

DISCLOSURE OF THE INVENTION

Problems that the Invention is to Solve

In the above-mentioned method, however, a PWM converter is provided after a filter (close to a switching element) for the purpose of controlling the resonance voltage of an input filter. In this case, the snubber energy becomes large, and thereby, variation in voltage of the filter condenser adversely becomes large when large electric power should be regenerated. This is likely to cause bad influence on the output voltage.

In view of such a problem, an object of the invention is to provide a PWM cycloconverter easily capable of improving an input current waveform and regenerating energy of a snubber into a power source.

Means for Solving the Problems

The invention is to regenerate snubber energy and to improve an input current by means of converter current in a PWM cycloconverter including a PWM converter connected to a DC voltage system, the output unit of which is connected to a place before (on the primary side of) an input filter of the PWM cycloconverter.

In order to solve the above problem, in a PWM cycloconverter including an AC power source in which phases are connected directly to phases of the output side thereof by means of a bi-directional switch having self-arc-extinguishing capability, wherein an AC power source voltage is PWM-controlled in response to an output voltage command to output variable voltage having variable frequency, the PWM cycloconverter includes: an input current detecting means for detecting one or more input current of the PWM cycloconverter; and a PWM converter connected to a DC voltage means, wherein an output unit of the PWM converter is connected to a place before an input filter of the PWM cycloconverter to keep down resonance of the input filter on the basis of an input current signal detected by means of the input current detecting means.

Further, the PWM cycloconverter further includes: one or more voltage clamping device provided with a diode rectifier connected to an input terminal of a semiconductor device for electric power of the PWM cycloconverter and with a smoothing capacitor; and a voltage detecting device for detecting voltage at the both ends of the smoothing capacitor, wherein the capacitor for clamping voltage is used for the DC voltage means.

Moreover, the PWM cycloconverter further includes: a snubber formed from a diode connected to an input terminal of a semiconductor device for electric power of the PWM cycloconverter and from a capacitor; and a snubber voltage detecting device for detecting voltage at the both ends of the smoothing capacitor connected to the snubber, wherein the capacitor for the snubber is used for the DC voltage means.

Effect of the Invention

Applying the invention allows improvement of an input current waveform and regeneration of energy of a snubber into a power source in a PWM cycloconverter to be easily performed.

On the basis of the principle of a PWM cycloconverter, an input current waveform can be originally controlled. An input unit, however, is directly connected to an output unit by means of a bi-directional semiconductor switch, so that output current should be simultaneously controlled. This causes a limitation in input current controlling performance. The invention relates to an assistant device for improving the controlling performance of a PWM cycloconverter. In accordance with the invention, a typical and small-sized PWM converter is applied for the purpose of easily achieving input current control.

DESCRIPTION OF THE REFERENCE NUMERALS AND SIGNS

Figure 1:
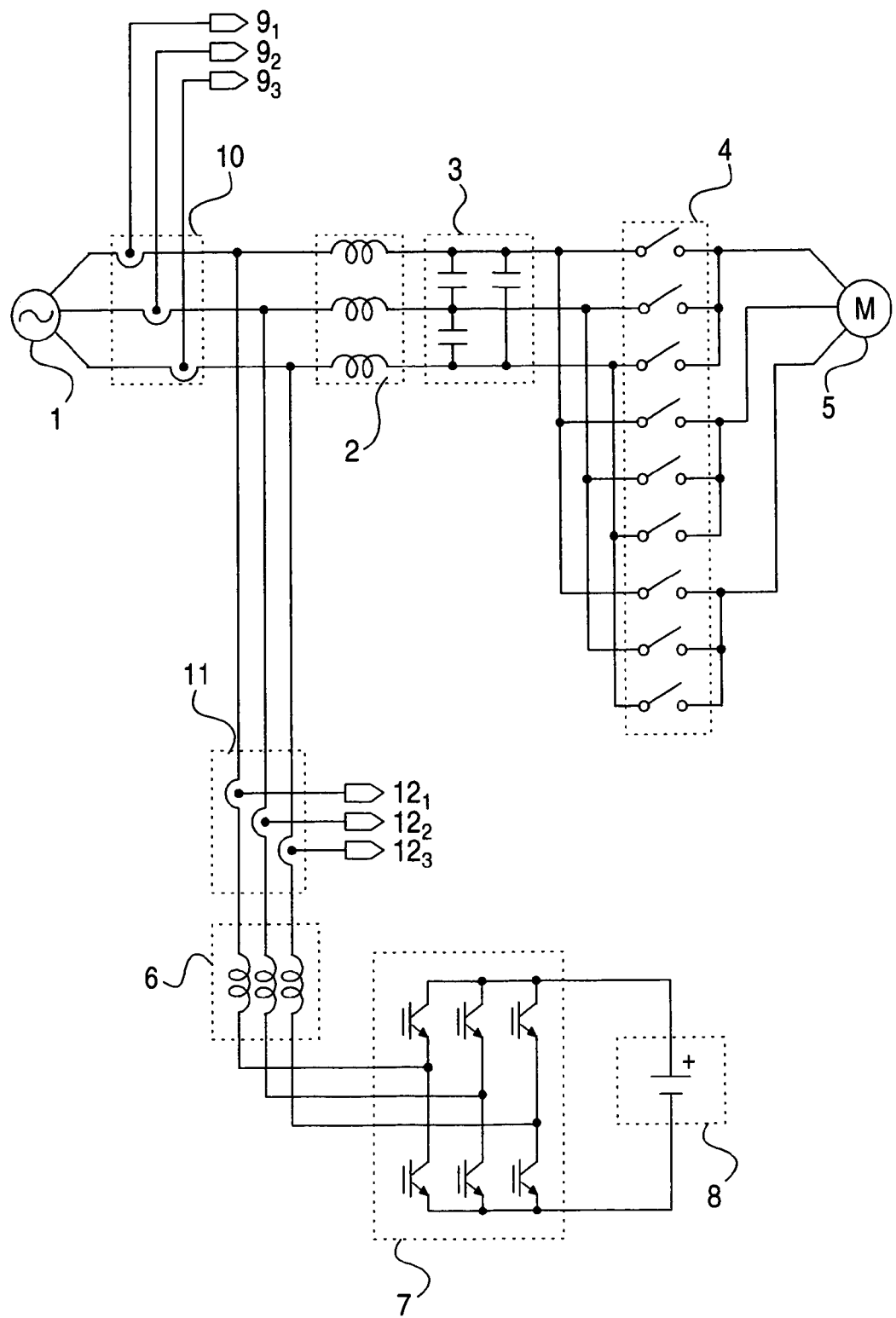
FIG. 1 shows a PWM cycloconverter and a system structure including a PWM converter using a DC voltage source in a mode for carrying out the invention.

1: Three-phase AC power source
2: Three-phase AC reactor
3: Three-phase AC capacitor
4: Bi-directional switch group
5: Motor
6: Three-phase AC reactor
7: PWM Converter
8: DC voltage source
$9_{1-3}$: Input current signal
10: CT for detecting electric current
11: CT for detecting electric current
$12_{1-3}$: Correction current signal
13: Diode rectifier
14: Smoothing capacitor
$15_{1-9}$: Snubber circuit
16: Diode group for snubber
17: Diode group for snubber

BEST MODE FOR CARRYING OUT THE INVENTION

The invention will be described hereinafter on the basis of concrete embodiments.

Embodiments

Figure 2:
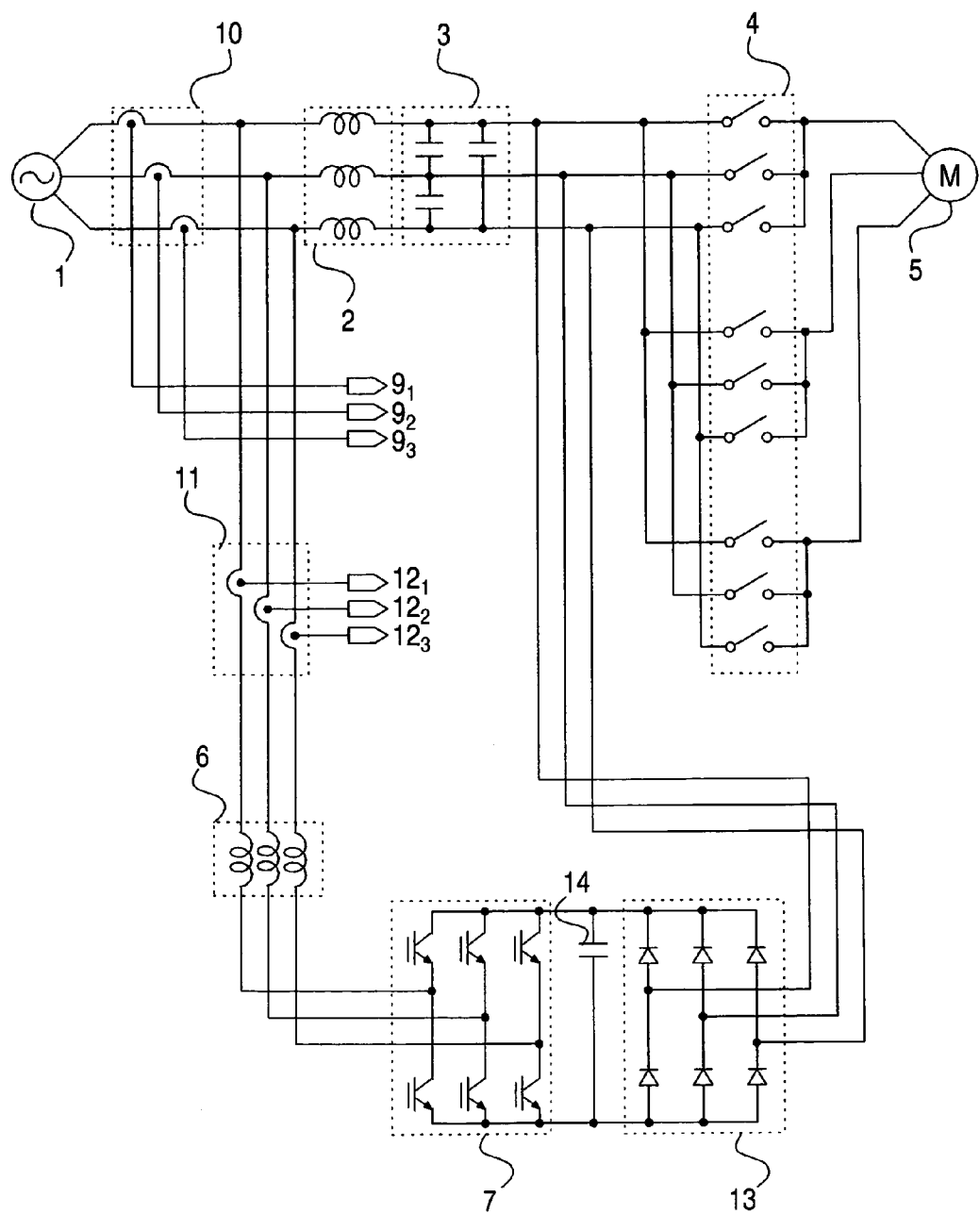
FIG. 2 shows a PWM cycloconverter and a system structure including a PWM converter using a diode rectifying circuit in a mode for carrying out the invention.
Figure 3:
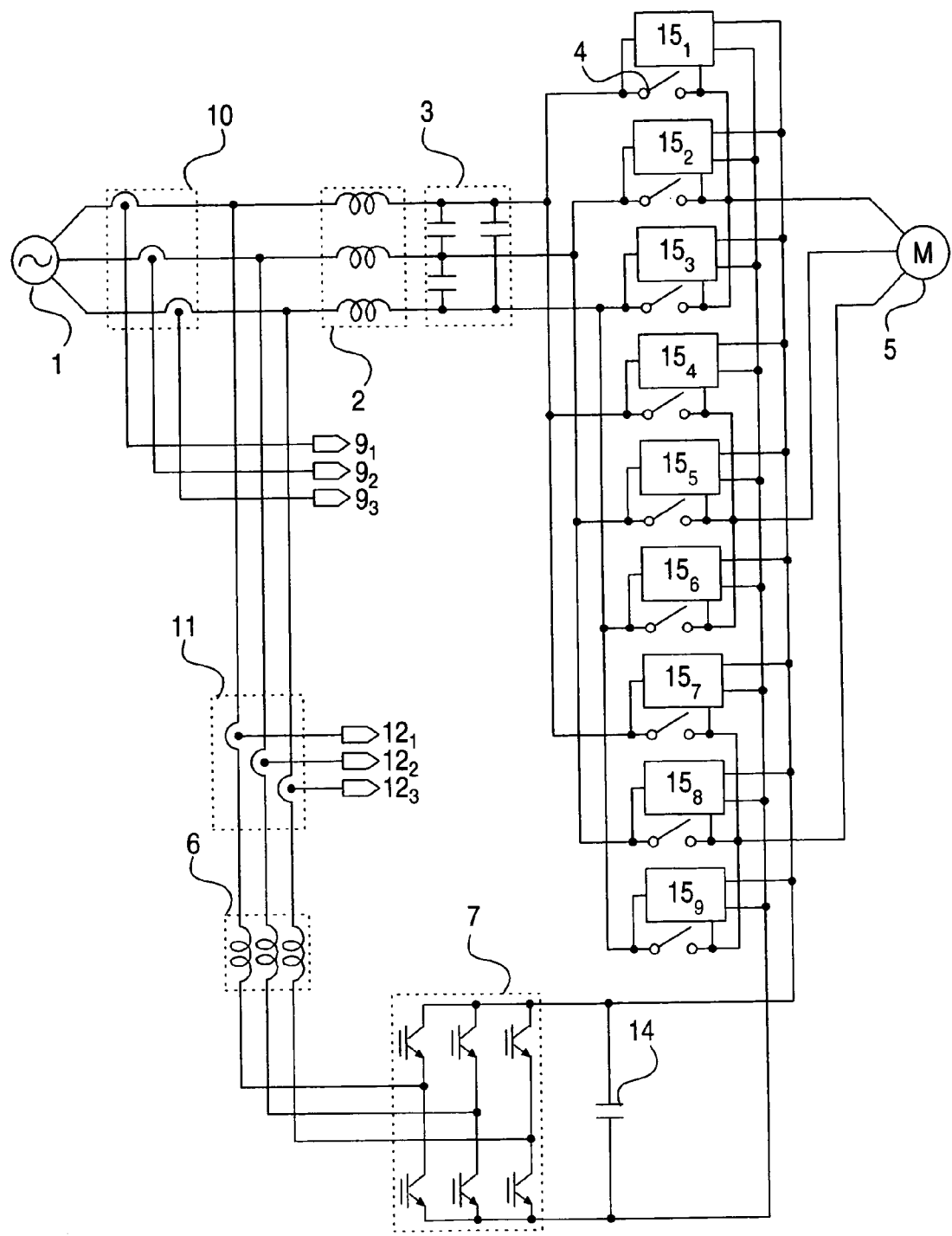
FIG. 3 shows a PWM cycloconverter and a system structure including a PWM converter using a DC voltage source formed from a snubber circuit in a mode for carrying out the invention.
Figure 4:
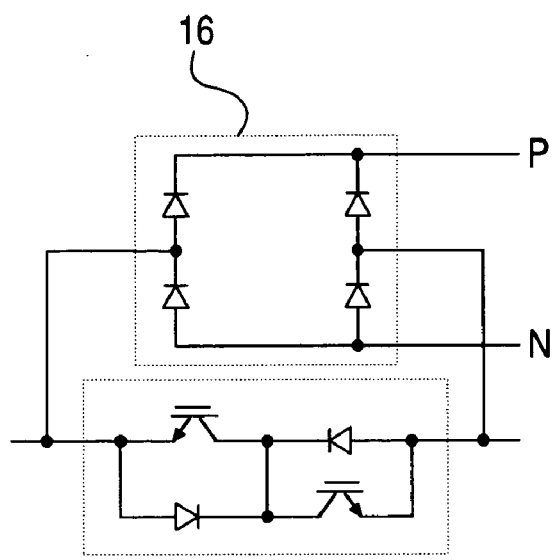
FIG. 4 shows an example of a structure of a snubber circuit in a mode for carrying out the invention.
Figure 5:
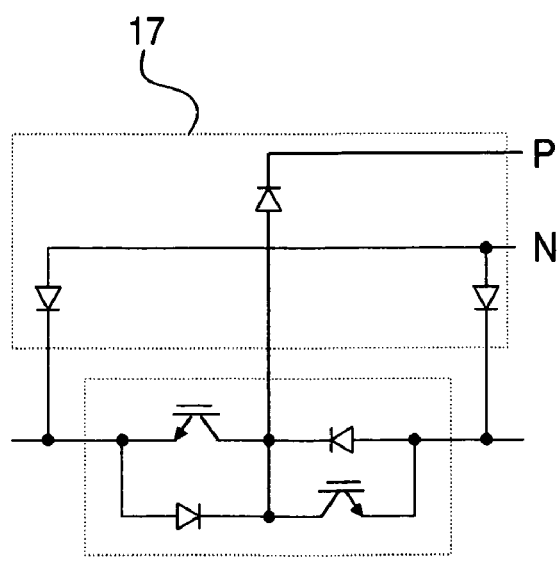
FIG. 5 shows an example of a structure of a snubber circuit in a mode for carrying out the invention.
Figure 6:
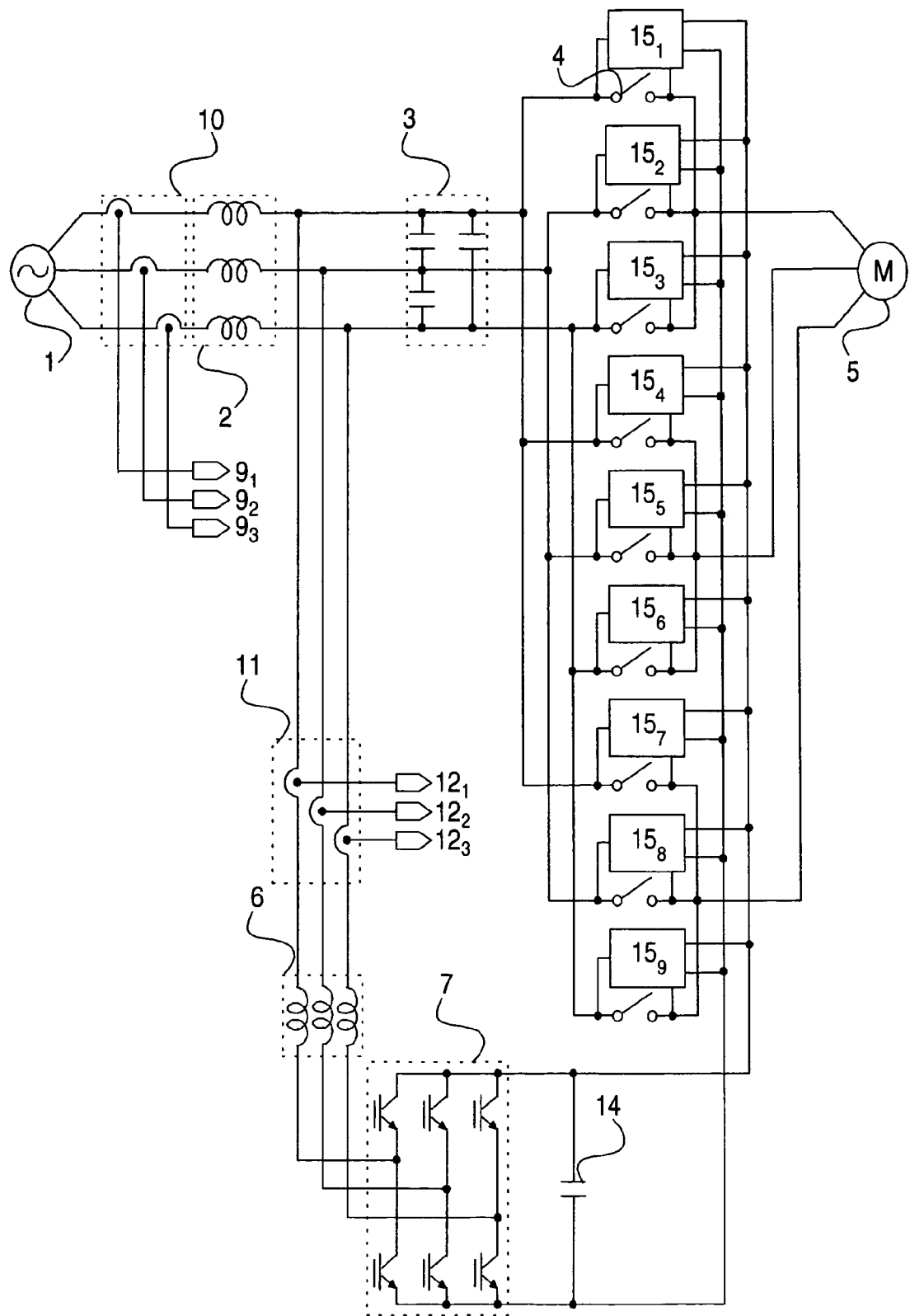
FIG. 6 shows an example of a conventional system structure of a PWM cycloconverter and a conventional method of keeping down filter resonance.

FIG. 1 shows a PWM cycloconverter and a system structure including a PWM converter using a DC voltage source in a mode for carrying out the invention. FIG. 2 shows a PWM cycloconverter and a system structure including a PWM converter using a diode rectifying circuit in a mode for carrying out the invention. FIG. 3 shows a PWM cycloconverter and a system structure including a PWM converter using a DC voltage source formed from a snubber circuit in a mode for carrying out the invention. FIG. 4 shows an example of a structure of a snubber circuit in a mode for carrying out the invention. FIG. 5 shows an example of a structure of a snubber circuit in a mode for carrying out the invention. FIG. 6 shows an example of a conventional system structure of a PWM cycloconverter and a conventional method of keeping down filter resonance.

In a system structure using a PWM converter in FIG. 1, elements under the same names as those in FIG. 6 showing a conventional embodiment are marked with the same reference signs and numerals as much as possible to omit repeated description. 8 denotes a DC voltage source used as a DC voltage means. FIG. 1 is different from FIG. 6 showing the conventional embodiment in location where the current detection CT 11 is provided. That is to say, the current detection CT 11 is provided in a connection line for connecting a connection point of the three-phase AC reactor 2 and the three-phase AC capacitor 3 with the PWM converter 7 in FIG. 6. On the other hand, the current detection CT 11 is provided in a connection line for connecting the three-phase AC power source 1 with the PWM converter 7 through no three-phase AC reactor 2 in FIG. 1 of the invention.

Now, an operation of the invention will be described. First, in the PWM cycloconvereter in FIG. 1, the three-phase AC power source 1 is directly connected to a three-phase output, which is input current of the motor 5, by means of a group 4 of totally nine bi-directional semiconductor switches provided between the three-phase AC power source 1 and the three-phase output and arbitrary frequency and voltage can be outputted without converting the AC power source voltage into DC. At the inputs of the bi-directional semiconductor switch group 4, however, pulse current flows. Accordingly, the three-phase AC reactor 2 and the three-phase AC capacitor 3 are used for forming an input filter. In accordance with the invention, providing the DC power source 8 other than the AC power source 1 and the small-sized PWM converter 7 in the DC power source 8 so as to supply a place before an input filter of the PWM cycloconverter with current allows the above-mentioned resonance current due to the input filter to be kept down. Inputting the input current signal $9_{1-3}$ detected by means of the CT for detecting electric current 10 to a control part of the PWM converter 7 as a current control means, performing comparison with any desired current waveform of the PWM cycloconverter and supplying the current of quantity equal to correction allow an ideal input current waveform to be achieved. Further, detecting the correction current signal $12_{1-3}$ allows control performance to be improved. As an example of a method of correction, in the case that resonance current is only a subject for control among high harmonic components of the input current, comparing the input current signal $9_{1-3}$ with an ideal sine wave and letting correction current flow from the PWM converter 7 enable the resonance current to be kept down. In this case, the resonance current varies in accordance with design of the filter, but a current value thereof is sufficiently smaller than that of the whole input current. This means that the capacity of current of the PWM converter 7 can be also small, so that it costs little expense.

FIG. 2 illustrates a case that a diode rectifier 13 is used for the DC power source 8 in FIG. 1 to rectify all of the three-phase waves and the DC power source smoothed by means of the smoothing capacitor 14 is used to drive the PWM converter 7. Such a structure allows the DC power source 8 to be omitted, so that there is an advantage in cost.

In FIG. 3, used is a DC clamping type snubber circuit 14 for the DC power source 8 in FIG. 1 and the diode rectifier 13 in FIG. 2. There is a case that the DC clamping type snubber circuit 14 is used as a protection device for a bi-directional semiconductor switch in the PWM cycloconverter. FIGS. 4 and 5 show circuitry of the snubber circuit 14 in FIG. 3. A structure such as a diode group for a snubber $15_{1-9}$ and a diode group for a snubber 16 can be considered for FIGS. 4 and 5, respectively. Using such a snubber circuit 14 as the DC power source voltage of the PWM converter 7 in the invention allows surge energy generated in switching to be used as correction current without being wasted, so that further higher efficiency can be achieved in a whole system.

INDUSTRIAL APPLICABILITY

In accordance with the invention, improvement of an input current waveform and regeneration of energy of a snubber into a power source can be easily performed, so that energy-saving drive of a motor can be achieved. Accordingly, the invention is especially useful as a control device for a motor such as an electrically-powered car, an elevator, a crane and a winding machine, which is used for regenerating electric power into a power source without consuming the electric power as heat.

The invention claimed is:

1. A PWM cycloconverter including an AC power source in which phases are connected directly to phases of the output side thereof by means of a bi-directional switch having self-arc-extinguishing capability, wherein an AC power source voltage is PWM-controlled in response to an output voltage command to output variable voltage having variable frequency, the PWM cycloconverter comprising:

an input current detecting means for detecting one or more input current of the PWM cycloconverter; and a PWM converter connected to a DC voltage means, wherein an output unit of the PWM converter is connected to a place before an input filter of the PWM cycloconverter to keep down resonance of the input filter on the basis of an input current signal detected by means of the input current detecting means.

2. The PWM cycloconverter according to claim 1, further comprising:

one or more voltage clamping device provided with a diode rectifier connected to an input terminal of a semiconductor device for electric power of the PWM cycloconverter and with a smoothing capacitor; and a voltage detecting device for detecting voltage at the both ends of the smoothing capacitor, wherein the capacitor for clamping voltage is used for the DC voltage means.

3. The PWM cycloconverter according to claim 1, further comprising:

a snubber formed from a diode connected to an input terminal of a semiconductor device for electric power of the PWM cycloconverter and from a capacitor; and a snubber voltage detecting device for detecting voltage at the both ends of the smoothing capacitor connected to the snubber, wherein the capacitor for the snubber is used for the DC voltage means.

* * * * *